June 5, 1951  C. F. MARTIN  2,555,417
HAND CONTROLLED CLUTCH AND BRAKE FOR TRACTORS
Filed June 3, 1948  2 Sheets-Sheet 1
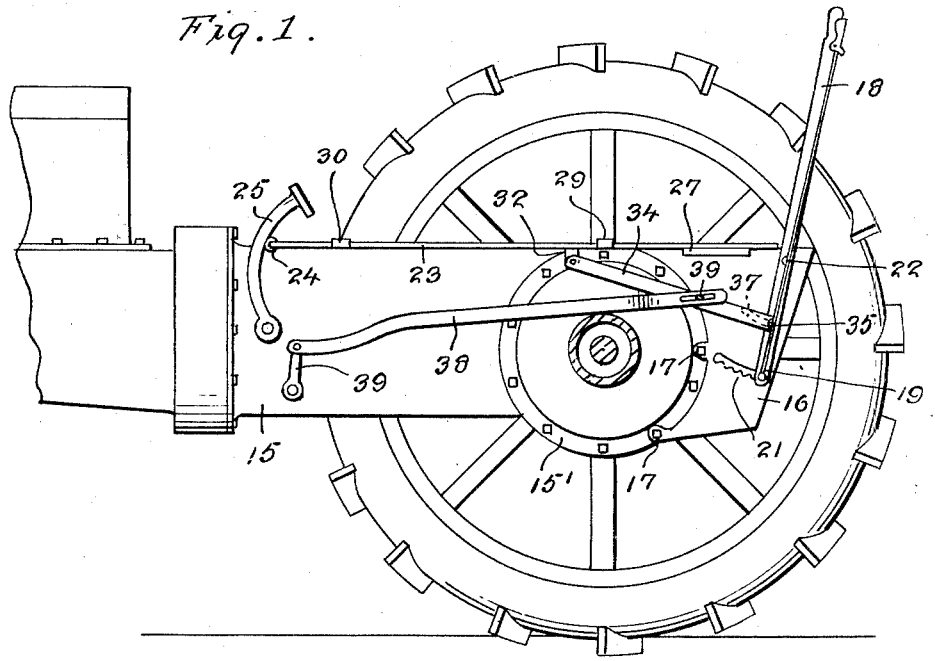
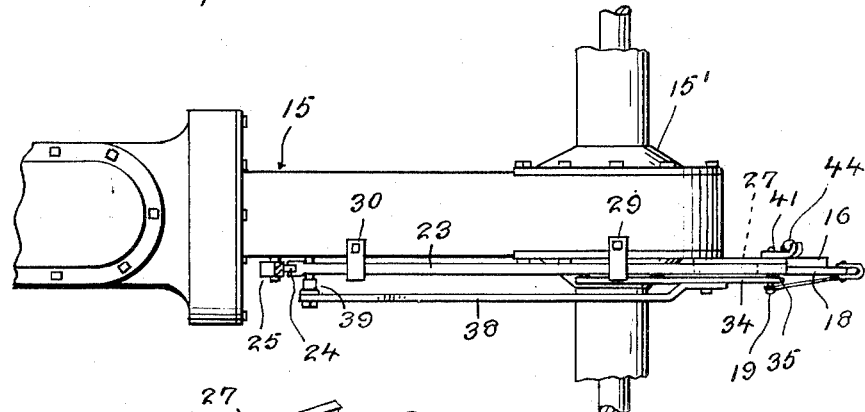
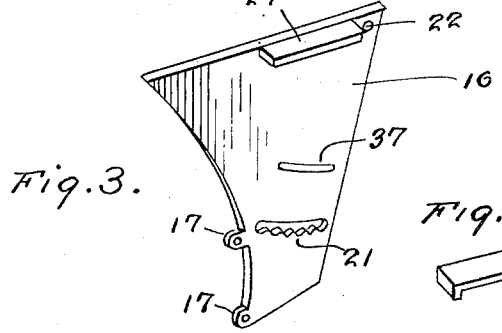
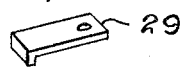
Cebal F. Martin
INVENTOR.
BY Victor J. Evans & Co.
Attorneys June 5, 1951  C. F. MARTIN  2,555,417
HAND CONTROLLED CLUTCH AND BRAKE FOR TRACTORS
Filed June 3, 1948  2 Sheets-Sheet 2
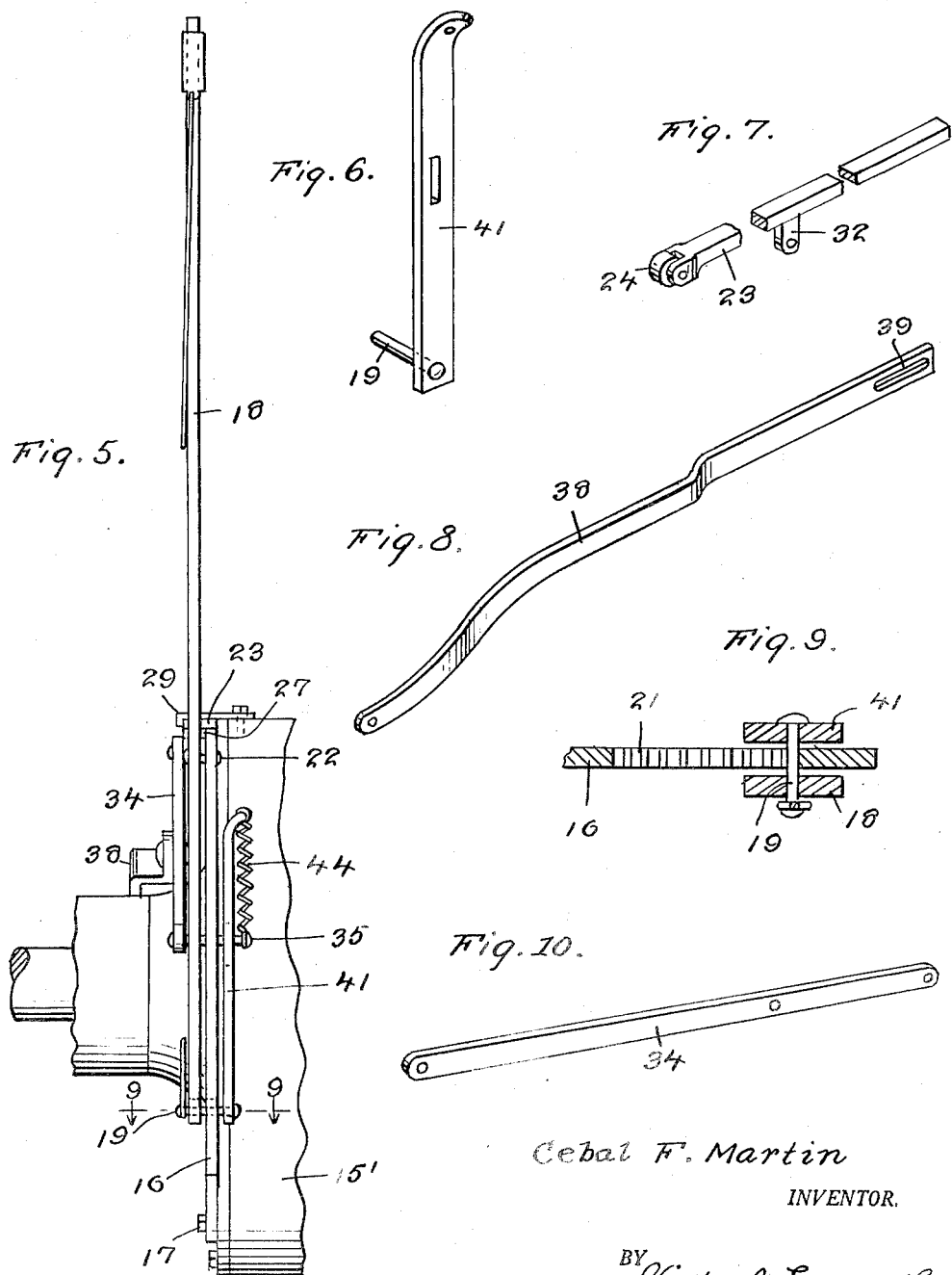
Cebal F. Martin
INVENTOR.
BY Victor J. Evans & Co
Attorneys Patented June 5, 1951

2,555,417

UNITED STATES PATENT OFFICE 2,555,417

HAND CONTROLLED CLUTCH AND BRAKE FOR TRACTORS

Cebal F. Martin, Gainsville, Tex.

Application June 3, 1948, Serial No. 30,875

2 Claims. (Cl. 74—481)

This invention relates to tractors and more particularly to a remote control arrangement for the clutch and brake thereof.

It is an object of the present invention to provide a remote control connection for tractors whereby the operator of the tractor can operate the clutch and brake while standing up on the draw bar of the tractor or when standing on the ground as when the connection is being effected with a tractor drawn implement and whereby labor and time will be saved in effecting the control of the tractor.

Other objects of the present invention are to provide a combined brake and clutch operating mechanism adapted to be connected to the rear of the tractor to be operated from that point, which is of simple construction, easy to apply upon the tractor and to be connected to the clutch and brake, inexpensive to manufacture, sturdy and efficient in operation.

For other objects and for a better understanding of the invention, reference may be had to the following detailed description taken in connection with the accompanying drawing, in which Fig. 1 is a side elevational view of the operating control parts mounted on the rear of a tractor.

Fig. 2 is a top plan view of the parts of the tractor.

Fig. 3 is a perspective view of the mounting plate adapted to be connected to the rear axle housing.

Fig. 4 is a perspective view of one of the guide clips.

Fig. 5 is a rear elevational view of the control parts.

Fig. 6 is a perspective view of one of the arms connected to the adjusting lever.

Fig. 7 is a fragmentary and perspective view of the clutch operating rod.

Fig. 8 is a perspective view of the link which is connected to the brake.

Fig. 9 is a sectional view taken on line 9—9 of Fig. 5.

Fig. 10 is a perspective view of the link which is connected between the adjusting arm and the clutch push rod.

Referring now to the figures, 15 represents a tractor having a rear axle housing 15' on which there is mounted a plate 16 having lugs 17 and 18 adapted to be connected to the bolts on the rear axle housing whereby to support the plate in a vertical position. Mounted on this plate is hand operating lever 18. The lever 18 has an opening in its lower end through which passes a detent device 19 that is adapted to cooperate with quadrant teeth 21 formed in a slot in the plate 16. The pivot connection of the lever 18 with the plate 16 is indicated at 22.

Longitudinally adjustable along the top of the tractor is a pusher rod 23 which has a roller 24 on its forward end adapted to engage with clutch lever 25 to cause its operation as the rod 23 is thrust forward by the engagement of the lever 18 with the rear end of the rod 23. The rod rests upon a shelf 27 at its rear end and is held thereupon by brackets 29 and 30 which are fastened to the top of the tractor body at different locations thereon and which are shown in perspective in Fig. 4.

Depending from the rod 23 is a lug 32 to which a link 34 is connected to effect the pushing of the rod 23. The link 24 is connected to the lever 18 at 35. As the lever 18 is pulled rearwardly about its pivot 22, the lower end of the lever will be moved forwardly and the link 34 will push the rod 23 forwardly whereby to engage the clutch lever and cause the clutch to be disengaged. After the clutch has been disengaged to a slight extent, an arm 37 on the lever 18 will engage the end of a link 38 which has a lost motion connection as indicated at 39 with the link 34 and the link 38 is connected to brake arm 39 whereby to cause the brake to be engaged. The detent device 19 will retain the lever 18 in its adjusted position on the quadrant 21. When it is desired to release the brake and to have the engagement of the clutch, the detent 19 is released and the lever arm 18 is pushed forwardly. This lever arm 18 is accessible by the operator from a draw bar or from the ground in rear of the tractor. The operator does not have to sit on the tractor to operate these parts.

On the opposite side of the lever 18 from the detent is a detent 41 which is pivoted to pin 22. A spring 44 extends between the pin 22 and the outer end of the detent 41 whereby to aid and assist the return of the parts when the detent device 19 is released.

The shelf 27 is disposed on the upper end of the mounting plate 16. The pin 35 travels in the slot 37 on the mounting plate 16.

While various changes may be made in the detail construction, it shall be understood that such changes shall be within the spirit and scope of the present invention as defined by the appended claims.

I claim:

1. In a control arrangement for a tractor including a rear axle housing, a clutch lever and a brake arm, a plate adapted to be connected to said housing, there being a slot arranged in said plate, a plurality of teeth projecting into said slot, a hand lever pivotally connected to said plate, a detent device carried by said hand lever and mounted for movement into and out of engagement with said teeth, a shelf secured to the upper end of said plate, a pusher rod slidably supported on said shelf and having a roller on one end thereof adapted to engage with the clutch lever, a bracket slidably connecting said pusher rod to said plate, a lug depending from said rod, a first link having one end pivotally connected to said lug and its other end pivotally connected to said hand lever, and a second link having one end connected to the tractor brake arm and its other end pivotally connected to said first link.

2. In a control arrangement for a tractor including a rear axle housing, a clutch lever and a brake arm, a plate adapted to be connected to said housing, there being a slot arranged in said plate, a plurality of teeth projecting into said slot, a hand lever pivotally connected to said plate, a detent device carried by said hand lever and mounted for movement into and out of engagement with said teeth, a shelf secured to the upper end of said plate, a pusher rod slidably supported on said shelf and having a roller on one end thereof adapted to engage with the clutch lever, a bracket slidably connecting said pusher rod to said plate, a lug depending from said rod, a first link having one end pivotally connected to said lug and its other end pivotally connected to said hand lever, a second link having one end connected to the tractor brake arm and its other end pivotally connected to said first link, and spring means on the opposite side of said plate from said links operatively connecting said hand lever with said detent.

CEBAL F. MARTIN.

REFERENCES CITED

The following references are of record in the file of this patent:

UNITED STATES PATENTS

| Number | Name | Date |
| --- | --- | --- |
| 470,494 | Kline | Mar. 8, 1892 |
| 974,649 | Fishburne | Nov. 1, 1910 |
| 1,119,270 | Gardner | Dec. 1, 1914 |
| 1,359,385 | Johnson | Nov. 16, 1920 |
| 1,459,258 | Reineke | June 19, 1923 |
| 1,801,987 | Strand | Apr. 21, 1931 |
| 1,820,359 | Manning | Aug. 25, 1931 |
| 1,874,526 | Herman | Aug. 30, 1932 |
| 2,228,917 | Walls | Jan. 14, 1941 |